No. 870,605. PATENTED NOV. 12, 1907.
G. D. WILSON.
GEARING.
APPLICATION FILED MAY 18, 1907.
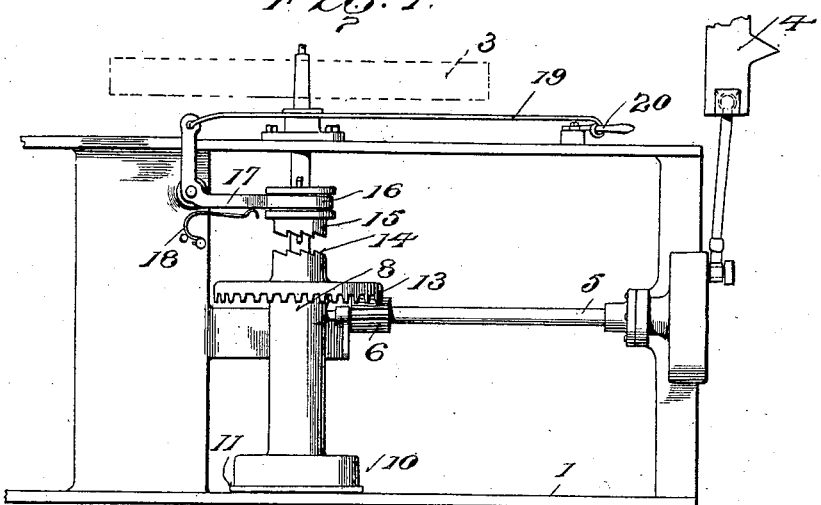
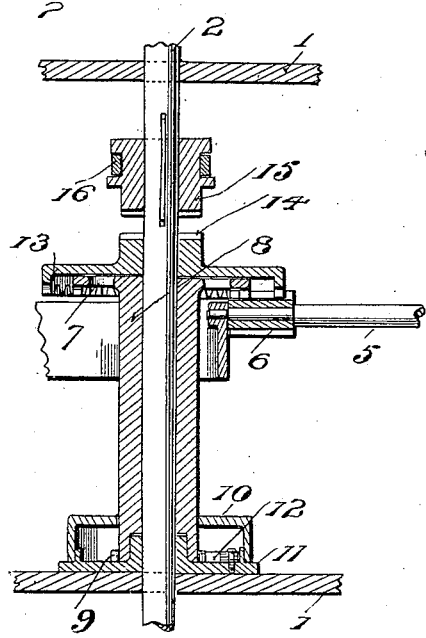
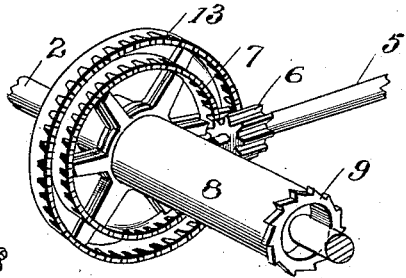
Witnesses
W. N. Woodson.
H. W. Sewan.
Inventor
G. D. Wilson
By R. H. A. B. Lacey,
Attorneys

UNITED STATES PATENT OFFICE.

GARLAND D. WILSON, OF SURVEYOR, WEST VIRGINIA.

GEARING.

No. 870,605.  Specification of Letters Patent.  Patented Nov. 12, 1907.

Application filed May 18, 1907. Serial No. 374,573.

*To all whom it may concern:*

Be it known that I, GARLAND D. WILSON, a citizen of the United States, residing at Surveyor, in the county of Raleigh and State of West Virginia, have invented certain new and useful Improvements in Gearing, of which the following is a specification.

This invention contemplates certain new and useful improvements in gearing and the invention, in the present instance, is illustrated as particularly designed for mowers, reapers, and other agricultural implements of similar nature, although it is to be understood that the invention is applicable to means for changing the relative speeds of any drive and driven shafts.

The invention consists in certain constructions, arrangements and combinations of the parts which I shall fully describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a top plan view of gearing embodying the principle of my invention; Fig. 2 is a horizontal sectional view thereof, the section being taken on about the line of the drive shaft; and, Fig. 3 is a detail perspective view of the high speed and low speed gear, and a portion of the driven shaft with which said elements mesh.

Corresponding and like parts are referred to in the following description and indicated in all the views of the drawings by the same reference characters.

Referring to the drawing, the numeral 1 designates the supporting framework of the drive and driven shafts, which, in the present instance is shown as the framework of a mowing machine, and 2 designates the drive shaft which, in the present instance, is the axle of the mowing machine, said axle being journaled on the traveling wheels 3.

4 designates the cutter bar, and 5 the actuating shaft therefor, which is the driven shaft in the present embodiment of the invention.

The shaft 5 is journaled in any suitable brackets in the framework and carries a relatively wide pinion 6 which is fast thereto at one end of the shaft. A crown gear wheel 7, which is the "low speed" gear element is mounted on the axle 2 and meshes with a portion of the pinion 6. The said gear wheel 7 is provided with an extended or transversely elongated hub 8 which is formed at one end with a ratchet 9 and a pawl casing 10 surrounds the ratchet, one disk 11 of said casing being fast on the axle or shaft 2 and carrying one or more pawls 12 that are pressed into engagement with the ratchet.

The ratchet teeth are so beveled that the crown wheel 7 will overrun the shaft 2, and, conversely the shaft or axle 2 can be turned backwardly without imparting any movement to the shaft 5. The relatively large crown gear wheel 13 is mounted loosely on the axle or shaft 2 and encircles and is concentric to the crown gear wheel 7. The gear wheel 13 constitutes the "high speed" gear element of the mechanism and is provided with a ratchet clutch hub 14 designed to be engaged with the clutch member 15 that is slidable along the axle or shaft, but held to turn therewith.

16 designates a yoke which is designed to move the clutch member 15 and is formed on one end with a shipper lever 17 fulcrumed intermediate of its ends on any stationary part of the framework or mechanism and normally pressed upon by a spring 18 so as to carry the clutch member 15 out of engagement with the clutch hub of the crown gear wheel 13. A link rod 19 connects one arm of the shipper lever with the hand lever 20, by which the operator may regulate the shipper lever so as to cause the engagement of the clutch members 14 and 15.

In the practical operation, it will be seen that the forward movement of the drive shaft 2 will rotate the low speed gear element 7 by means of the ratchet connection, said low speed gear element being always in mesh with the pinion 6. Under normal conditions, the high speed gear element will run loose on the axle, being always in mesh with the pinion 6, but imparting no motion thereto, so long as the clutch is disengaged and the said high speed gear element permitted to run free on the drive shaft. As soon, however, as the clutch is engaged, it will be seen that the rotation of the axle will then cause a high speed to be imparted to the shaft, because the drive shaft 2 will be fast with the gear element 13 which is of relatively larger circumference than the gear element 7. Hence, the latter will overrun on the axle, owing to the ratchet pawl connection before described.

From the foregoing description in connection with the accompanying drawings, it will be seen that I have provided a very simple, durable and efficient construction of variable speed gearing in which either the high speed gear element or low speed gear element may run free, according to the arrangement of parts as predetermined, and both of said gear elements are always in mesh with the pinion 6 of the driven shaft no matter whether the high speed gear or low speed gear is in commission.

While I have described and shown the present embodiment of my invention as capable of two speeds, it is manifest that my invention is not limited thereto, but that a greater number of speeds may be produced, and it is also to be understood that although the present pinion 6 is shown as a relatively wide or double pinion on the driven shaft 5, two separate pinions may be mounted on said shaft, and that when in the appended claims it is recited that the high and low speed gear elements are in driving connection with the driven shaft, that such terms also include any means whatever, or intermediate train of gearing for operatively connecting the said gear elements with the shaft.

Having thus described the invention, what is claimed as new is:

1. The combination of a drive shaft, a driven shaft, a gear element on the driven shaft, gear elements mounted on the drive shaft, and all of which are always in driving connection with the gear element of the driven shaft, means for clutching one of the gear elements of the drive shaft to the said shaft, and a driving connection between the other gear element of the drive shaft and the drive shaft, said last named driving connection permitting the said last named gear element to overrun.

2. The combination of a drive shaft, a driven shaft, gear elements mounted on the drive shaft, one concentric of the other and both of them always in driving connection with the driven shaft, one of said gear elements having a ratchet connection with the drive shaft and the other loose on said shaft, and means for clutching said loose element to the drive shaft.

3. The combination of a drive shaft, a driven shaft, a pinion on said driven shaft, a low speed gear element having a ratchet connection with the drive shaft and meshing with said pinion, a high speed gear element loose on the drive shaft and also meshing with said pinion, and means for clutching the high speed gear element to the drive shaft.

4. The combination of a drive shaft, a driven shaft, a pinion on said driven shaft, a gear wheel meshing with said pinion and mounted on said drive shaft, said gear wheel being provided with a ratchet, a pawl disk fast on the drive shaft, a pawl mounted on said disk and meshing with said ratchet, another gear wheel meshing with said pinion and mounted loosely on the drive shaft, encircling and concentric to the first named gear, and means for clutching said last named gear wheel to the drive shaft.

In testimony whereof I affix my signature in presence of two witnesses.

GARLAND D. WILSON. [L. S.]

Witnesses:
L. N. STONE,
W. A. HUTCHISON.